United States Patent
Pope et al.

(10) Patent No.: US 10,087,766 B2
(45) Date of Patent: Oct. 2, 2018

(54) STRUCTURAL GUIDE VANE OUTER DIAMETER K GUSSETS

(71) Applicant: United Technologies Corporation, Hartford, CT (US)

(72) Inventors: Andrew Pope, Glendale, NY (US); John P. Lucashu, Durham, CT (US); Jason Leroux, Kensington, CT (US); Carl Brian Klinetob, East Haddam, CT (US); Thomas B. Hyatt, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 370 days.

(21) Appl. No.: 14/765,274

(22) PCT Filed: Mar. 10, 2014

(86) PCT No.: PCT/US2014/022557
§ 371 (c)(1),
(2) Date: Jul. 31, 2015

(87) PCT Pub. No.: WO2014/164483
PCT Pub. Date: Oct. 9, 2014

(65) Prior Publication Data
US 2015/0369067 A1    Dec. 24, 2015

Related U.S. Application Data

(60) Provisional application No. 61/779,110, filed on Mar. 13, 2013.

(51) Int. Cl.
F03D 11/04    (2006.01)
F03B 3/18    (2006.01)
(Continued)

(52) U.S. Cl.
CPC .............. *F01D 9/02* (2013.01); *F01D 9/042* (2013.01); *F01D 25/246* (2013.01); *F01D 25/28* (2013.01);
(Continued)

(58) Field of Classification Search
CPC .......... F01D 9/02; F01D 9/042; F01D 25/246; F01D 25/28; F02C 7/20; F05D 2220/32;
(Continued)

(56) References Cited

U.S. PATENT DOCUMENTS 5,292,227 A * 3/1994 Czachor ................ F01D 25/162
415/142
5,320,490 A * 6/1994 Corbin .................... F01D 9/042
415/209.2
(Continued)

FOREIGN PATENT DOCUMENTS

EP    1 219 785 B1    12/2011

OTHER PUBLICATIONS

Extended European Search Report for EP Application No. 14778949.9, dated Nov. 9, 2016, 7 pages.
(Continued)

*Primary Examiner* — Deming Wan
(74) *Attorney, Agent, or Firm* — Kinney & Lange, P.A.

(57) ABSTRACT

A guide vane includes an airfoil with a first end and a second end. A platform is disposed at a first end of the airfoil, and a K-gusset is disposed on the platform opposite the airfoil. The K-gusset includes four bosses and ribs extending between the bosses in a "K" configuration.

17 Claims, 5 Drawing Sheets

(51) Int. Cl.
  *F03D 1/04* (2006.01)
  *F03D 3/04* (2006.01)
  *F01D 9/02* (2006.01)
  *F01D 9/04* (2006.01)
  *F01D 25/24* (2006.01)
  *F01D 25/28* (2006.01)
  *F02C 7/20* (2006.01)

(52) U.S. Cl.
  CPC ............ *F02C 7/20* (2013.01); *F05D 2220/32* (2013.01); *F05D 2230/60* (2013.01); *F05D 2240/80* (2013.01); *F05D 2260/94* (2013.01); *Y02T 50/671* (2013.01); *Y02T 50/673* (2013.01)

(58) Field of Classification Search
  CPC ............ F05D 2230/60; F05D 2240/80; F05D 2260/94; Y02T 50/671; Y02T 50/673
  USPC ................ 415/209.4; 416/241 R, 179, 204 R
  See application file for complete search history.

(56) References Cited

U.S. PATENT DOCUMENTS

| | | |
|---|---|---|
| 5,411,370 A | 5/1995 | Varsik |
| 6,343,912 B1 | 2/2002 | Manteiga et al. |
| 6,371,725 B1* | 4/2002 | Manteiga ............ F01D 5/14 415/209.4 |
| 8,162,603 B2 | 4/2012 | Schilling |
| 2004/0033137 A1 | 2/2004 | Glover et al. |
| 2008/0072569 A1* | 3/2008 | Moniz ................ F01D 5/147 60/226.1 |
| 2011/0229326 A1 | 9/2011 | Papin et al. |
| 2011/0243752 A1 | 10/2011 | Duchaine |

OTHER PUBLICATIONS

The International Preliminary Report on Patentability dated Sep. 24, 2015 for International Application No. PCT/US2014/022557.

* cited by examiner

STRUCTURAL GUIDE VANE OUTER DIAMETER K GUSSETS

CROSS-REFERENCE TO RELATED APPLICATION(S)

This application claims the benefit of U.S. Provisional Application No. 61/779,110 filed Mar. 13, 2013 for "Structural Guide Vane Outer Diameter K Gussets" by Andrew Pope, John P. Lucashu, Jason Leroux, Carl Brian Klinetob, Thomas B. Hyatt and claims the benefit of PCT application PCT/US2014/022557 filed Mar. 10, 2014 for "Structural Guide Vane Outer Diameter K Gussets" by Andrew Pope, John P. Lucashu, Jason Leroux, Carl Brian Klinetob, Thomas B. Hyatt.

BACKGROUND

This invention relates generally to gas turbine engines and more particularly to an improved fan outlet structural guide vane.

A gas turbine engine, such as a turbofan engine for an aircraft, includes a fan section, a compression section, a combustion section and a turbine section. The engine has a centrally located axis, which extends longitudinally through the sections. A fan case and a smaller diameter compressor case cooperate to radially bound an annular fan duct and divide the flow path for the working medium gases into a primary flow path and a secondary flow path. The primary flow path extends axially through the sections of the engine. The secondary flow path extends through the fan duct parallel to and radially outward of the primary flow path.

During engine operation, the fan draws the working medium gases, for example air, into the engine. The air drawn along the primary flow path into the compression section is compressed. The compressed air is channeled to the combustion section where fuel is added to the compressed air and the air/fuel mixture is burned. The products of combustion are discharged to the turbine section. The turbine section extracts work from these products to power the fan and compressor. Additional energy not needed to drive the fan and compressor contributes to useful thrust.

In traditional turbofan engines, rigid radial struts extend between the fan case and the compressor case to support static and dynamic loads during operation. This assembly of the fan case, compressor case, and radial struts is frequently referred to as the intermediate casing. A fan outlet guide vane is situated upstream from the struts of the intermediate case and downstream from the fan to de-swirl the circumferentially flowing air discharged from the fan into an axial direction prior to the air flowing into the primary and secondary flow paths. As there is always a need in the aircraft industry to reduce engine weight and complexity, some turbofan engines now replace the radial struts and outlet guide vane with a single array of structural guide vanes that function to both de-swirl the airflow exiting the fan and support static and dynamic loads during engine operation.

This dual function structural guide vane generally includes an assembly of airfoils extending between the fan case and the compressor, and circumferentially spaced apart from one another. In some prior art embodiments, the end of each airfoil includes a platform that would abut against the platforms of adjacent airfoils to form the aerodynamic outer diameter and inner diameter of the flow path across the structural guide vane. Generally, the outer platform of each airfoil is connected to the fan case by bolts, and the inner platform of each airfoil is connected to the compressor case by an assembly of bolts, spacers, nuts and inserts. Because the outer platform of each airfoil is situated between the fan case and its corresponding airfoil, the outer platform transfers loads from the airfoil to the fan case. Similarly, the inner platform of each airfoil transfers loads from the compressor case to its corresponding airfoil due to its being situated between the airfoil and the compressor case. Due to the loads they experience during engine operation, the outer platforms and the inner platforms must be reinforced to support the loads and resist bending and deformation.

Prior art methods of reinforcing the platforms include forming a large number of relatively tall axial ribs and circumferential ribs on the platform sides opposite the airfoil. Using a large number of tall axial ribs and circumferential ribs on each platform does strengthen the platforms against bending, but it does so at the cost of adding to the overall weight of the engine. Prior art methods also include coupling the ends of each airfoil directly to the fan case and compressor, and assembling platform panels between the airfoils to create the outer diameter and inner diameter flow paths across the structural guide vane. By connecting the airfoils directly to the cases, the platform panels do not require reinforcement as they do not transfer loads between the compressor case, the airfoils, and the fan case. However, the platform panels do increase the overall complexity and cost of the engine by increasing the number of parts to assemble during the initial assembling and in the event that the structural guide vane requires disassembly for maintenance or repair.

SUMMARY

According to the present invention, a guide vane includes an airfoil with a first end and a second end. A platform is disposed at a first end of the airfoil and a K-gusset is disposed on the platform opposite the airfoil.

In another embodiment of the present invention, a guide vane includes a platform with a first surface and a second surface. A vane body extends from the first surface of the platform and a gusset is disposed on the second surface of the platform. The gusset includes a forward rib disposed proximate a forward edge of the platform and the forward rib includes a first end and a second end. An aft rib is disposed proximate an aft edge of the platform and includes a first end and a second end. A back rib extends from the first end of the forward rib to the first end of the aft rib. A first angled rib extends from the second end of the forward rib to the back rib. A second angled rib extends from the second end of the aft rib to the back rib, contacting the back rib between the aft rib and the first angled rib.

In another embodiment of the present invention, a guide vane includes an airfoil with a first end and a second end. A platform is disposed at a first end of the airfoil, and a K-gusset is disposed on the platform opposite the airfoil. The K-gusset includes a first boss and a second boss disposed proximate a forward edge of the platform and circumferentially spaced apart from each other. A third boss and a fourth boss are disposed proximate an aft edge of the platform and circumferentially spaced apart from each other.

DETAILED DESCRIPTION

The present invention provides a gusset for distributing loads across a platform of a structural guide vane without significantly increasing the complexity or weight of the structural guide vane. The present invention distributes loads across the platform by providing a K-gusset with ribs in a light weight "K" shaped configuration.

Figure 1:
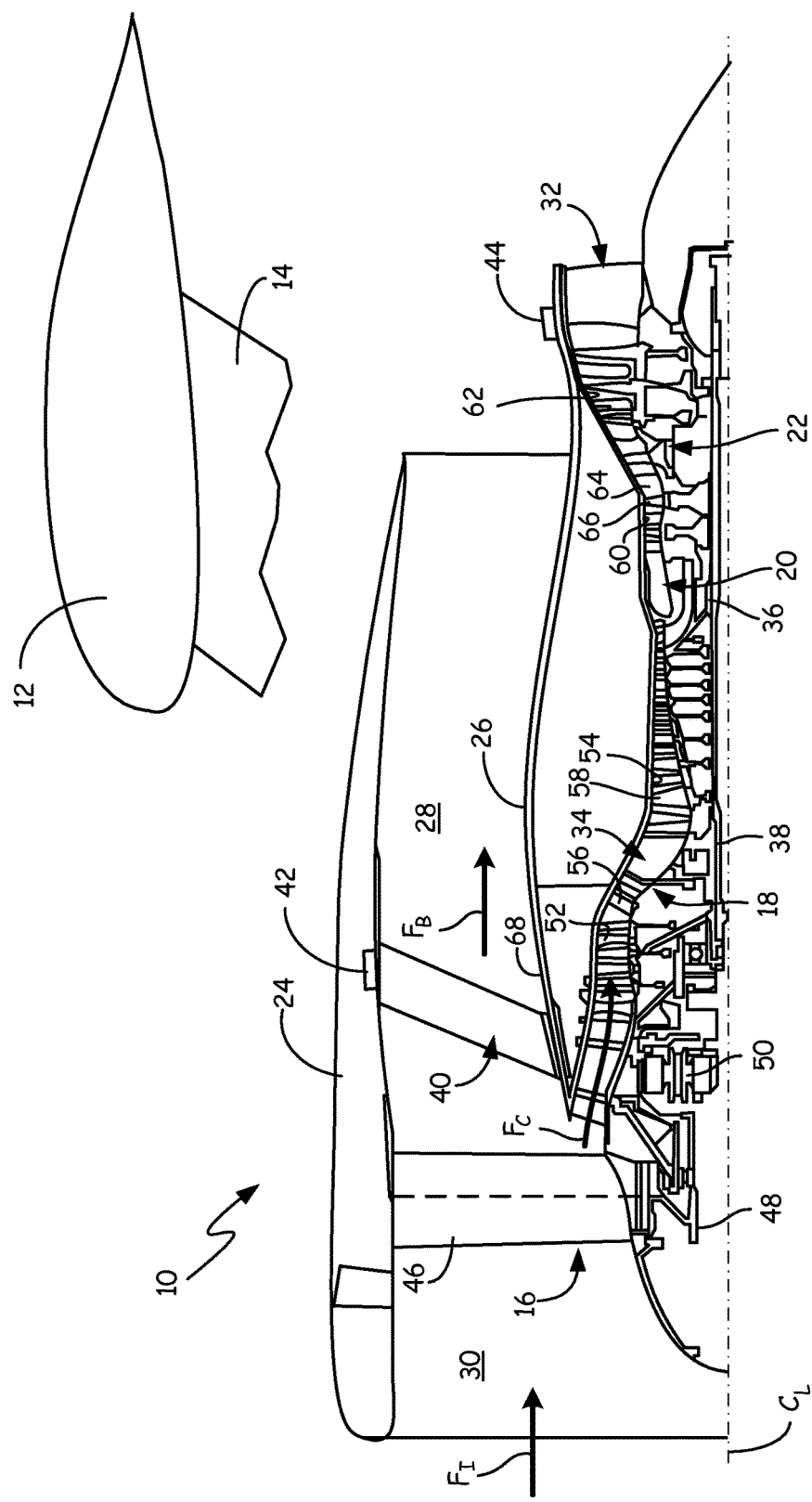
FIG. 1 is a cross-sectional view of an embodiment of a gas turbine engine.

FIG. 1 is a cross-sectional view of gas turbine engine 10, in a turbofan embodiment, aircraft wing 12, and pylon 14. As shown in FIG. 1, gas turbine engine 10 includes fan 16, compressor 18, combustor 20, turbine 22, fan case 24, core case 26, bypass duct 28, upstream inlet 30, downstream exhaust nozzle 32, core flow path 34, high pressure (HP) shaft 36, low pressure (LP) shaft 38, structural guide vanes 40, first engine mount 42, second engine mount 44, engine centerline $C_L$, incoming airflow $F_I$, core flow $F_C$, and bypass flow $F_B$. As embodied in FIG. 1, fan 16 includes fan airfoils 46, fan disk 48, and fan drive mechanism 50. Compressor 18 includes low pressure compressor (LPC) section 52, high pressure compressor (HPC) section 54, compressor vanes 56, and compressor blades 58. Turbine 22 includes high pressure turbine (HPT) section 60, low pressure turbine (LPT) section 62, turbine vanes 64, and turbine blades 66. Core case 26 includes compressor case 68.

Fan 16, compressor 18, combustor 20, and turbine 22 are arranged in flow series with upstream inlet 30 and downstream exhaust nozzle 32 along engine centerline $C_L$. Fan case 24 is disposed around fan 16. Core case 26 is disposed around compressor 18, combustor 20, and turbine 22 within fan case 24, thereby defining bypass duct 28 between core case 26 and fan case 24. Compressor case 68 is the portion of core case 26 that houses compressor 18. Compressor 18, combustor 20, and turbine 22 comprise the engine core with core flow path 34 extending through each section of the engine core. Compressor vanes 56 and compressor blades 58 are disposed in stages within both LPC section 52 and HPC section 54 of compressor 18. Turbine vanes 64 and turbine blades 66 are disposed in stages within both HPT section 60 and LPT section 62 of turbine 22. HP shaft 36 couples HPC section 54 to HPT section 60, forming the high pressure spool or high spool. LP shaft 38 couples fan 16 and LPC section 52 to LPT section 62, forming the low pressure spool or low spool. HP shaft 36 and LP shaft 38 are typically coaxially mounted, with the high and low spools independently rotating about engine centerline $C_L$.

Fan airfoils 46 of fan 16 are circumferentially arranged around fan disk 48, which is coupled directly or indirectly to LPC section 52 and driven by LP shaft 38. In some embodiments, such as the embodiment of FIG. 1, fan 16 is coupled to the low pressure spool via geared fan drive mechanism 50, providing independent fan speed control. As shown in FIG. 1, fan 16 is forward-mounted and provides thrust by accelerating flow downstream through bypass duct 28. In operation of gas turbine engine 10, incoming airflow $F_I$ enters inlet 30 and divides into core flow $F_C$ and bypass flow $F_B$, downstream of fan 16. Core flow $F_C$ propagates along core flow path 34 through compressor 18, combustor 20 and turbine section 22, and bypass flow $F_B$ propagates along the bypass flow path through bypass duct 28.

LPC section 52 and HPC section 54 of compressor 18 are utilized to compress incoming air for combustor 20, where fuel is introduced, mixed with air and ignited to produce hot combustion gas. Depending on the embodiment, fan 16 also provides some degree of compression (or pre-compression) to core flow $F_C$, and LPC section 52 (or a portion of it) may be omitted. Alternatively, an additional intermediate spool may be included, for example in a three-spool turboprop or turbofan configuration.

Combustion gas exits combustor 20 and enters HPT section 60 of turbine 22, encountering turbine vanes 64 and turbine blades 66. Turbine vanes 64 turn and accelerate the flow, and turbine blades 66 generate lift for conversion to rotational energy via HP shaft 36, driving HPC section 54 of compressor 18 via HP shaft 36. Partially expanded combustion gas transitions from HPT section 60 to LPT section 62, driving LPC section 52 and fan 16 via LP shaft 38. Exhaust flow exits LPT section 62 and gas turbine engine 10 via exhaust nozzle 32.

Structural guide vanes 40 are disposed inside bypass duct 28 and extend between fan case 24 and compressor case 68. As bypass flow $F_B$ flows from fan 16 into bypass duct 28, structural guide vanes 40 de-swirl bypass flow $F_B$ into an axial direction substantially parallel to engine centerline $C_L$. Structural guide vanes 40 also connect core case 26 to fan case 24 and center core case 26 and the engine core inside fan case 24. First engine mount 42 is disposed on fan case 24 proximate structural guide vanes 40 and second engine mount 44 may be disposed on core case 26 proximate downstream exhaust nozzle 32. First engine mount 42 and second engine mount 44 are used to connect gas turbine engine 10 to pylon 14, pylon 14 being connected to aircraft wing 12. During operation of gas turbine engine 10, structural guide vane 40 supports static and dynamic loads between compressor case 68 and fan case 24.

Figure 2:
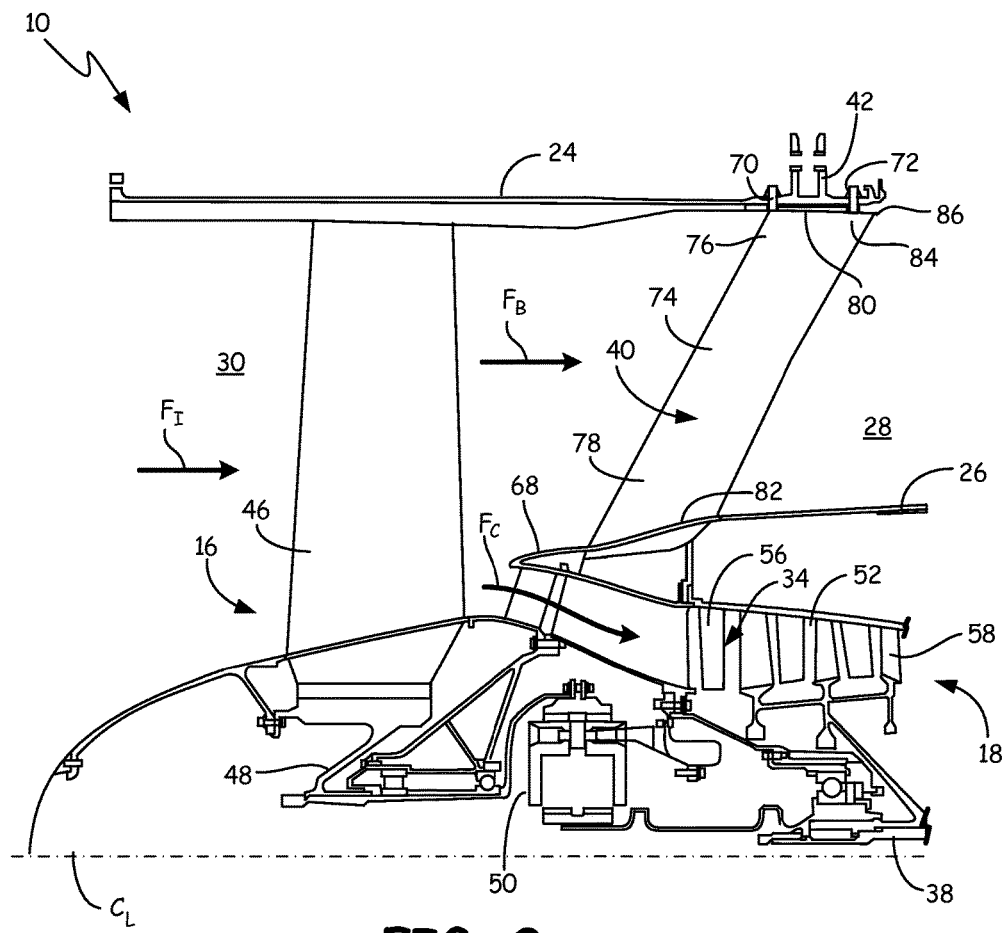
FIG. 2 is an enlarged cross-sectional view of the engine of FIG. 1.

FIG. 2 is an enlarged cross-sectional view of the embodiment of gas turbine engine 10 disclosed in FIG. 1. As shown in FIG. 2, gas turbine engine 10 includes fan 16, compressor 18, fan case 24, core case 26, bypass duct 28, upstream inlet 30, core flow path 34, low pressure (LP) shaft 38, structural guide vanes 40, first engine mount 42, bolts 70, nuts 72, engine centerline $C_L$, incoming airflow $F_I$, core flow $F_C$, and bypass flow $F_B$. As embodied in FIG. 1, fan 16 includes fan airfoils 46, fan disk 48, and fan drive mechanism 50. Compressor 18 includes low pressure compressor (LPC) section 52, compressor vanes 56, and compressor blades 58. Core case 26 includes compressor case 68. Structural guide vanes 40 include airfoils 74, each airfoil including first end 76, second end 78, outer platform 80, and inner platform 82. Outer platform 80 includes first inner surface 84 and second outer surface 86.

In FIG. 2, components of like numbering with the components of FIG. 1 are assembled as discussed above with reference to FIG. 1. First end 76 of airfoil 74 is connected to or integral with inner platform 82. First end 76 is bolted to compressor case 68. Inner platform 82, along with inner platforms 82 of adjacent airfoils 74, forms the aerodynamic inner diameter of the flow path across structural guide vanes 40. First inner surface 84 of outer platform 80 faces radially inward towards engine centerline $C_L$, and second end 78 of airfoil 74 is connected to or integral with first inner surface 84. Outer platform 80 is connected to fan case 24 by bolts 70 and nuts 72 such that second outer surface 86 of outer platform 80 faces fan case 24.

Figure 3:
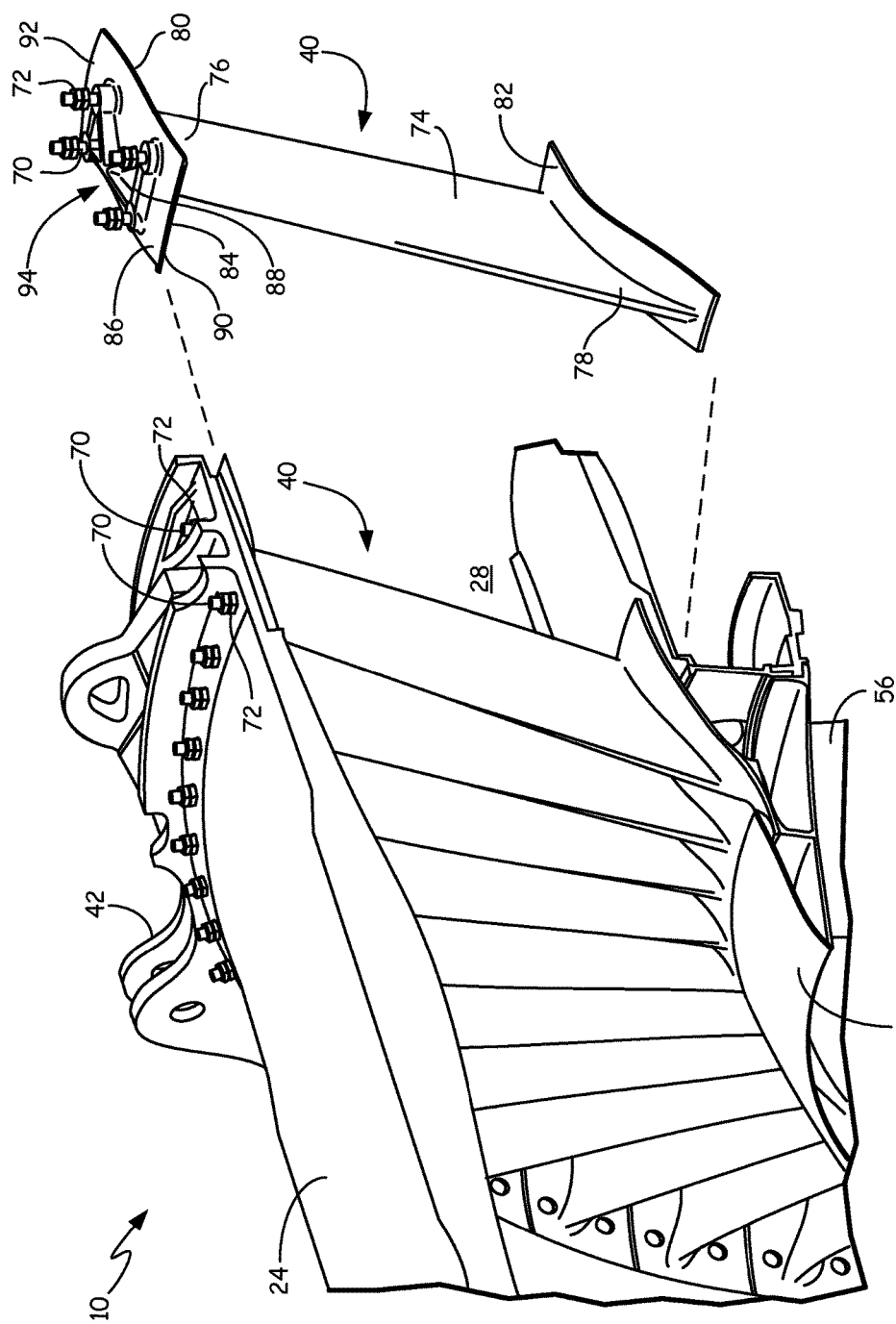
FIG. 3 is an enlarged perspective cross-sectional view of the engine of FIG. 2.

FIG. 3 is an enlarged exploded perspective cross-sectional view of gas turbine engine 10 showing structural guide vanes 40 with one of vanes 40 disconnected from gas turbine engine 10. As shown in FIG. 3, gas turbine engine 10 includes fan case 24, bypass duct 28, structural guide vanes 40, first engine mount 42, compressor vane 56, compressor case 68, bolts 70, and nuts 72. As embodied in FIG. 1, each structural guide vane 40 includes airfoil 74 with first end 76, second end 78, outer platform 80, inner platform 82 and K-gusset 94. Outer platform 80 includes first inner surface 84, second outer surface 86, forward edge 90, and aft edge 92.

In FIG. 3, components of like numbering with the components of FIG. 2 are assembled as discussed above with reference to FIG. 2. Outer platform 80 extends axially between forward edge 90 and aft edge 92. K-gusset 94 is disposed on second outer surface 86 of outer platform 80 between forward edge 90 and aft edge 92, and opposite first end 76 of airfoil 74. K-gusset 94 extends radially outward from second outer surface 86 of outer platform 80 towards fan case 24. Bolts 70 extend through outer platform 80, K-gusset 94, and fan case 24 to connect, with the help of nuts 72, airfoil 74 and outer platform 80 to fan case 24. Together, K-gusset 94, bolts 70, and nuts 72 provide a simple and low profile means for connecting structural guide vane 40 to fan case 24. Spacers 88 may be disposed between K-gusset 94 and fan case 24 to adjust the radial position of structural guide vane 40 with respect to fan case 24. Inner platform 82 and second end 78 of airfoil 74 are bolted to compressor case 68. With first end 76 connected to fan case 24 and second end 78 connected to compressor case 68, structural guide vane 40 is fixed between fan case 23 and compressor case 68 and provides a load path through which static and dynamic loads may be carried between compressor case 68 and fan case 24. To support and withstand these loads, structural guide vane 40 may be made from a high strength metal material, such as a forged aluminum alloy or titanium alloy. As discussed in more detail below in the discussion of FIGS. 4 and 5, K-gusset 94 includes a simple and light weight K-shaped configuration that reinforces and distributes loads across outer platform 80. By distributing loads across outer platform 80, K-gusset 94 prevents stress concentrations from arising inside outer platform 80 that could lead to deformation of outer platform 80 and failure of structural guide vane 40.

Figure 4:
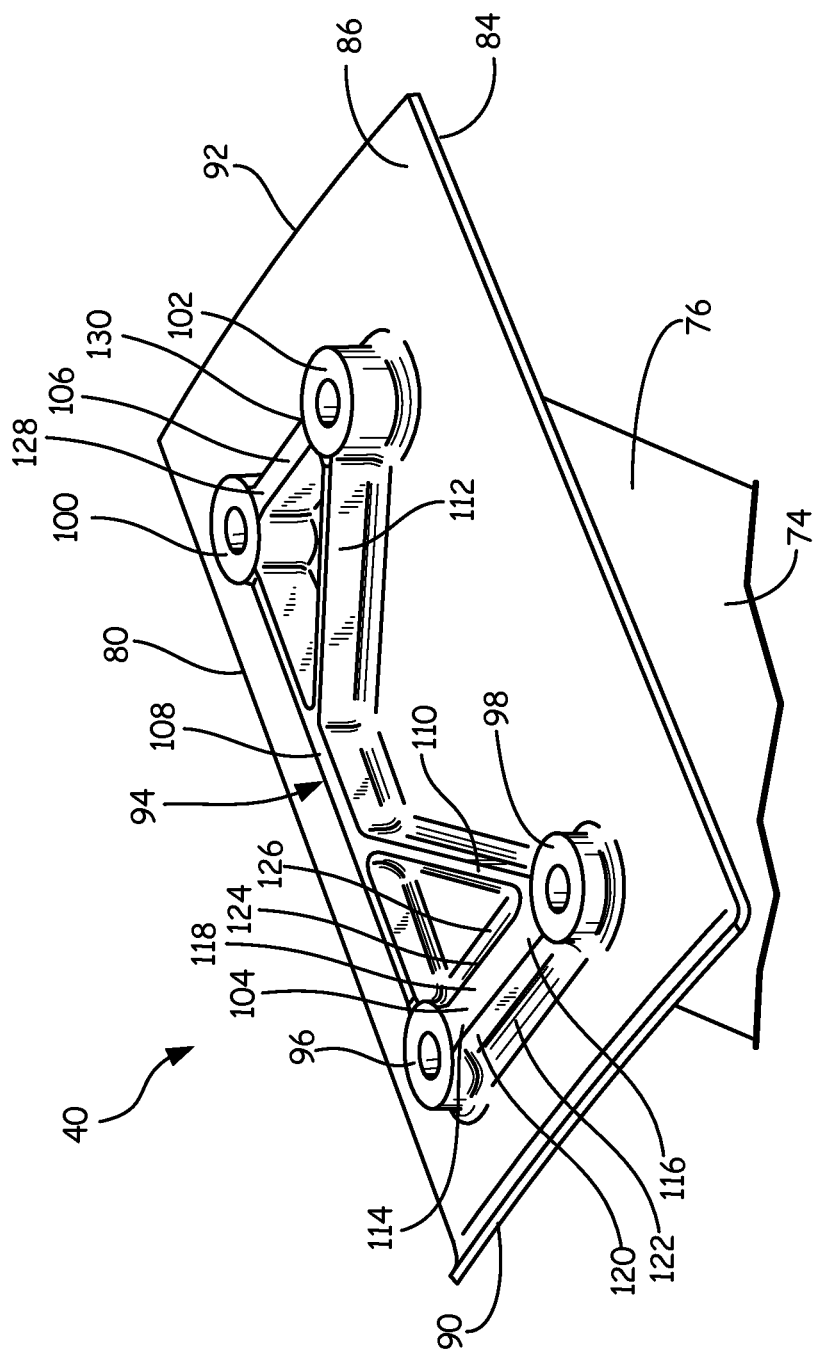
FIG. 4 is an enlarged perspective view of a first end of a structural guide vane from the engine of FIG. 3.
Figure 5:
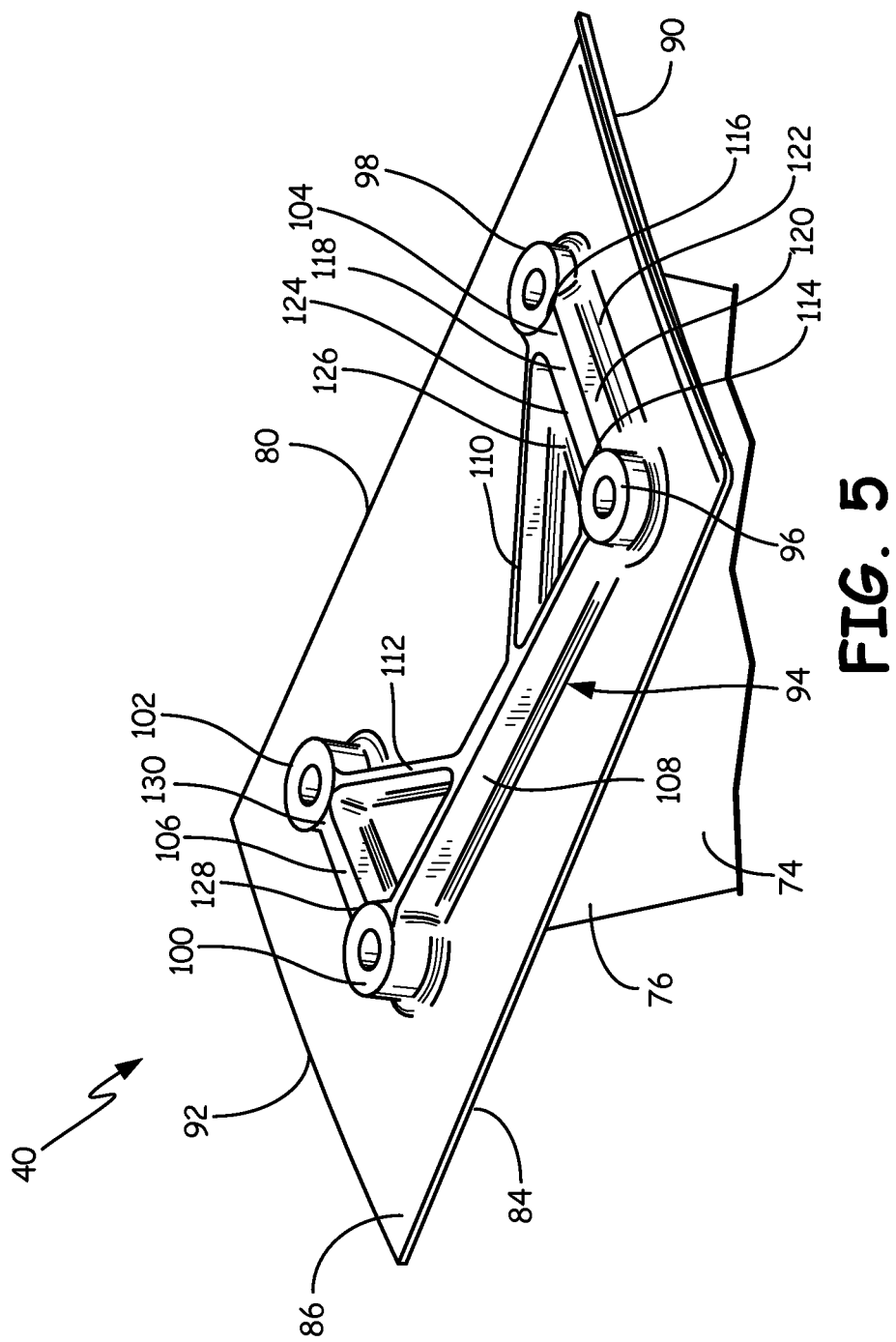
FIG. 5 is the perspective view of the first end of the structural guide vane from FIG. 4 rotated one-hundred and eighty degrees.

FIG. 4 is an enlarged perspective view of first end 76 of structural guide vane 40 from FIG. 3, and FIG. 5 is the perspective view of FIG. 4 rotated one-hundred and eighty degrees. As shown in FIGS. 4 and 5, structural guide vane 40 includes airfoil 74, first end 76, outer platform 80, and K-gusset 94. Outer platform 80 includes first inner surface 84, second outer surface 86, forward edge 90, and aft edge 92. K-gusset 94 includes first boss 96, second boss 98, third boss 100, fourth boss 102, forward rib 104, aft rib 106, back rib 108, first angled rib 110, and second angled rib 112. Forward rib 104 includes first end 114, second end 116, top surface 118, forward side surface 120, forward taper 122, aft side surface 124, and aft taper 126. Aft rib 106 includes first end 128 and second end 130.

In FIGS. 4 and 5, components of like numbering with the components of FIG. 3 are assembled as discussed above with reference to FIG. 3. K-gusset 94 is disposed on second outer surface 86 of outer platform 80 and is positioned on second outer surface 86 over the neutral axis of airfoil 74. K-gusset 94 is integral with outer platform 80. Outer platform 80 gradually angles inward radially from forward edge 90 to aft edge 92, such that the outer diameter flowpath across structural guide vane 40 narrows downstream.

First boss 96 and second boss 98 are disposed on second outer surface 86 of outer platform 80 proximate forward edge 90 and are circumferentially spaced apart from each other. Third boss 100 and fourth boss 102 are disposed on second outer surface 86 of outer platform 80 proximate aft edge 92 and are circumferentially spaced apart from each other. First boss 96, second boss 98, third boss 100, and fourth boss 102 all include a hole through which one of bolts 70, shown in FIGS. 2-3, may be received to connect outer platform 80 to fan case 24. Because outer platform 80 angles radially inward, the height of third boss 100 and fourth boss 102 in relation to second outer surface 86 of outer platform 80 is greater than that of first boss 96 and second boss 98. Also, because outer platform 80 angles radially inward, third boss 100 and fourth boss 102 are circumferentially spaced closer to one another than first boss 96 is to second boss 98, as discussed in greater detail below.

Back rib 108 extends axially between first boss 96 and the third boss 100. Because outer platform 80 angles radially inward, the height of back rib 108 in relation to second outer surface 86 of outer platform 80 increases as back rib 108 extends from first boss 96 to third boss 100. First angled rib 110 extends from second boss 98 and contacts or connects with back rib 108 between first boss 96 and third boss 100. Second angled rib 112 extends from fourth boss 102 to back rib 108, contacting or connecting with back rib 108 between third boss 100 and first angled rib 110. Second angled rib 112 connects to back rib 108 without contacting first angled rib 110. Back rib 108 increases in thickness between where first angled rib 110 meets back rib 108 and where second angled rib 112 meets back rib 108, thereby strengthening and stiffening the portion of back rib 108 between first angled rib 110 and second angled rib 112. Together, back rib 108, first angled rib 110, and second angled rib 112 generally resemble the shape of the letter "K," with back rib 108 forming the back or spine of the "K" and first angled rib 110 and second angled rib 112 forming the branches or legs of the "K."

Aft rib 106 extends between third boss 100 and fourth boss 102, first end 128 of aft rib 106 being connected to or integral with third boss 100 and second end 130 of aft rib 106 being connected to or integral with fourth boss 102. Forward rib 104 extends between first boss 96 and second boss 98, first end 114 of forward rib 104 being connected to or integral with first boss 96 and second end 116 of forward rib 104 being connected to or integral with second boss 98. Forward rib 104 and aft rib 106 are substantially parallel.

Because outer platform 80 angles radially inward, as discussed above, aft rib 106 extends away from second outer surface 86 of outer platform 80 in the radial direction a height greater than forward rib 104. Because aft rib 106 is radially taller than forward rib 104, aft rib 106 is stiffer with respect to radial loads than forward rib 104. Because aft rib 106 is stiffer than forward rib 104, aft rib 106 is capable of supporting the aft portion of outer platform 80 with a smaller circumferential length than forward rib 104, and is therefore shorter in circumferential length than forward rib 104. To accommodate the shorter circumferential length of aft rib 106, third boss 100 and fourth boss 102 are positioned circumferentially closer to one another than first boss 96 is to second boss 98, as discussed previously above.

Forward rib 104 is wider than aft rib 106 in the forward-aft direction. Top surface 118 is disposed on forward rib 104 opposite outer platform 80. On the forward side of forward rib 104, forward side surface 120 extends radially inward from top surface 118 toward outer platform 80. Forward taper 122 extends axially forward and radially inward from forward side surface 120 to outer platform 80. On the aft side of forward rib 104, aft side surface 124 extends radially inward from top surface 118 toward outer platform 80. Aft taper 126 extends axially aftward and radially inward from aft side surface 124 to outer platform 80. Forward taper 122 and aft taper 126 have a combined forward-aft width larger than a forward-aft width of forward rib 104. Forward taper 122 and aft taper 126 reinforce and stiffen forward rib 104 against radial loads. Without forward taper 122 and aft taper 126, forward rib 104 would be more flexible and susceptible to bending given that it is shorter radially and longer circumferentially than aft rib 106. K-gusset 94, with forward rib 104, aft rib 106, back rib 108, first angled rib 110, and second angled rib 112, provides a low profile gusset that reduces stress concentrations and distributes static and dynamic loads across outer platform 80 without substantially increasing the weight or complexity of structural guide vane 40.

In view of the foregoing description, it will be recognized that the present disclosure provides numerous advantages and benefits. For example, the present disclosure provides structural guide vane 40 with outer platform 80 and K-gusset 94. K-gusset 94 distributes loads across outer platform 80 and reduces stress concentrations in outer platform 80 without significantly increasing the weight or complexity of structural guide vane 40. Furthermore, structural guide vane 40 with K-gusset 94 is simple to attach and detach from fan case 24, which in turn reduces the time and cost associated with assembling structural guide vane 40 inside gas turbine engine 10, or disassembling structural guide vane 40 from gas turbine engine 10 for maintenance or repair.

While the invention has been described with reference to an exemplary embodiment(s), it will be understood by those skilled in the art that various changes may be made and equivalents may be substituted for elements thereof without departing from the scope of the invention. For example, while K-gusset 94 has been described as being disposed on outer platform 80, K-gusset 94 may also be used on inner platform 82. Furthermore, while K-gusset 94 has been described as being used on structural guide vanes 40, K gusset 94 may also be used on other vanes or airfoils used in gas turbine engine 10 or in other flow machines. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A guide vane comprising:
an airfoil with a first end and a second end;
a platform disposed at the first end of the airfoil;
a K-gusset disposed on the platform opposite the airfoil, wherein the K-gusset comprises:
a first boss and a second boss disposed proximate a forward edge of the platform and circumferentially spaced apart from each other: and
a third boss and a fourth boss disposed proximate an aft edge of the platform and circumferentially spaced apart from each other, wherein a height of the third boss and the fourth boss in relation to the platform is greater than that of the first boss and the second boss.

2. The guide vane of claim 1, wherein the K-gusset further comprises:
a forward rib extending between the first boss and the second boss;
an aft rib extending between the third boss and the fourth boss;
a back rib extending between the first boss and the third boss;
a first angled rib extending from the second boss and contacting the back rib between the first boss and the third boss; and
a second angled rib extending from the fourth boss to the back rib, the second angled rib contacting the back rib between the third boss and the first angled rib.

3. The guide vane of claim 2, wherein a forward side of the forward rib tapers to the platform.

4. The guide vane of claim 2, wherein an aft side of the forward rib tapers to the platform.

5. The guide vane of claim 2, wherein a length of the forward rib between the first boss and the second boss is longer than a length of the aft rib between the third boss and the fourth boss.

6. The guide vane of claim 2, wherein a height of the back rib in relation to the platform increases as the back rib extends from the first boss to the third boss.

7. The guide vane of claim 2, wherein the second angled rib contacts the back rib between the third boss and the first angled rib without the second angled rib contacting the first angled rib.

8. The guide vane of claim 7, wherein the back rib increases in thickness between where the first angled rib meets the back rib and where the second angled rib meets the back rib.

9. A guide vane comprising:
a platform with a first surface and a second surface;
an airfoil extending from the first surface of the platform;
a gusset disposed on the second surface of the platform, the gusset comprising;
a forward rib disposed proximate a forward edge of the platform, the forward rib comprising a first end and a second end;
an aft rib disposed proximate an aft edge of the platform, the aft rib comprising a first end and a second end;
a back rib extending from the first end of the forward rib to the first end of the aft rib;
a first angled rib extending from the second end of the forward rib to the back rib; and
a second angled rib extending from the second end of the aft rib to the back rib, the second angled rib contacting the back rib between the aft rib and the first angled rib.

10. The guide vane of claim 9, wherein the forward rib includes a forward taper that extends from a forward side of the forward rib to the platform, and an aft taper that extends from an aft side of the forward rib to the platform.

11. The guide vane of claim 10, wherein the forward taper and the aft taper have a combined forward-aft width larger than a forward-aft width of the forward rib.

12. The guide vane of claim 9, wherein the forward rib is wider than the aft rib in a forward-aft direction.

13. The guide vane of claim 9, wherein the aft rib extends a height away from the second surface of the platform greater than the forward rib.

14. The guide vane of claim 9, wherein the forward rib and the aft rib are parallel.

15. A guide vane comprising:
an airfoil with a first end and a second end;
a platform disposed at the first end of the airfoil; and
a K-gusset disposed on the platform opposite the airfoil, the K-gusset comprising: a first boss and a second boss disposed proximate a forward edge of the platform and circumferentially spaced apart from each other;

a third boss and a fourth boss disposed proximate an aft edge of the platform and circumferentially spaced apart from each other;

a forward rib extending between the first boss and the second boss;

an aft rib extending between the third boss and the fourth boss;

a back rib extending between the first boss and the third boss;

a first angled rib extending from the second boss and contacting the back rib between the first boss and the third boss;

and a second angled rib extending from the fourth boss to the back rib, the second angled rib contacting the back rib between the third boss and the first angled rib.

16. The guide vane of claim 15, wherein the forward rib comprises:

a top surface disposed on the forward rib opposite the platform;

a forward side surface extending radially inward from the top surface toward the platform; and a forward taper extending axially forward and radially inward from the forward side surface to the platform.

17. The guide vane of claim 15, wherein the forward rib comprises:

a top surface disposed on the forward rib opposite the platform;

an aft side surface extending radially inward from the top surface toward the platform; and an aft taper extending axially aftward and radially inward from the aft side surface to the platform.

* * * * *